US006917797B1

(12) United States Patent
Hoppa

(10) Patent No.: US 6,917,797 B1
(45) Date of Patent: Jul. 12, 2005

(54) PERSONAL SIGNAL TRANSMISSION AND TRACKING SYSTEM FOR LOCATING INDIVIDUALS

(76) Inventor: Daniel Hoppa, 509 Rural St., Berlin, WI (US) 54923

(*) Notice: Subject to any disclaimer, the term of this patent is extended or adjusted under 35 U.S.C. 154(b) by 0 days.

(21) Appl. No.: 09/511,527

(22) Filed: Feb. 23, 2000

(51) Int. Cl.[7] .............................................. H04M 11/00

(52) U.S. Cl. ............................... 455/404.1; 455/456.1; 455/414.2; 379/45; 340/628

(58) Field of Search ........................... 455/404.1, 404.2, 455/456.1, 414.2, 404, 456, 457, 521; 379/45, 37, 38; 340/628, 7.55, 7.63, 825.49, 7.5, 7.21, 287; 342/457

(56) References Cited

U.S. PATENT DOCUMENTS

| | | | | | |
|---|---|---|---|---|---|
| 4,596,988 | A | * | 6/1986 | Wanka | 342/457 |
| 5,515,419 | A | * | 5/1996 | Sheffer | 455/456 |
| 5,521,582 | A | * | 5/1996 | Kingston | 340/539 |
| 5,594,425 | A | * | 1/1997 | Ladner et al. | 340/825.49 |
| 5,598,460 | A | * | 1/1997 | Tendler | 455/404 |
| 5,652,570 | A | * | 7/1997 | Lepkofker | 340/573.4 |
| 5,894,591 | A | * | 4/1999 | Tamayo | 340/7.5 |
| 5,969,673 | A | * | 10/1999 | Bickley et al. | 342/357.09 |
| 6,044,257 | A | * | 3/2000 | Boling et al. | 455/404 |
| 6,073,005 | A | * | 6/2000 | Raith et al. | 455/404.1 |
| 6,226,510 | B1 | * | 5/2001 | Boling et al. | 455/404.2 |

* cited by examiner

*Primary Examiner*—Tilahun Gesesse

(74) *Attorney, Agent, or Firm*—John D. Gugliotta; P. Jeff Martin; Olen L. York, III

(57) ABSTRACT

A personal safety signaling apparatus is provided for communicating the presence of an emergency to a monitoring station. The monitoring station then triangulates the location of the emergency signal and alerts an emergency response vehicle.

2 Claims, 8 Drawing Sheets

PERSONAL SIGNAL TRANSMISSION AND TRACKING SYSTEM FOR LOCATING INDIVIDUALS

RELATED APPLICATIONS

The present invention was first described in Disclosure Document Number 457,367 filed on Jun. 7, 1999. There are no previously filed, nor currently any co-pending applications, anywhere in the world.

BACKGROUND OF THE INVENTION

1. Field of the Invention

The present invention relates generally to tracking and emergency signaling devices and, more particularly, to a personal safety signaling apparatus and system.

2. Description of the Related Art

In the related art, many methods for emergency tracking and rescue signaling are known. For example, the following patents disclose a tracking system and method for a cellular phone unit and integrated emergency signal transmitter: U.S. Pat. No. 5,515,419 issued in the name of Sheffer, and, U.S. Pat. No. 5,218,367 issued in the name of Sheffer et al;

Further, the following patents describe an emergency signaling unit and alarm system designed to be carried on the person: U.S. Pat. No. 4,998,095 issued in the name of Shields; U.S. Pat. No. 4,468,656 issued in the name of Clifford et al; U.S. Pat. No. 4,121,160 issued in the name of Cataldo; and, U.S. Pat. No. 5,894,591 issued in the name of Tamayo discloses a personal emergency response communication apparatus for pagers.

Also, U.S. Pat. No. 5,335,246 issued in the name of Yokev et al. describes a pager with reverse paging facility and a mobile receiver.

And again, U.S. Pat. No. 4,467,142 issued in the name of Rupp et al. discloses an automatic dialing system for transmitting emergency calls from persons requiring assistance.

Consequently, a need has been felt for providing an apparatus and method which overcomes provides effective, location specific signaling and emergency tracking in a portable manner.

SUMMARY OF THE INVENTION

It is therefore an object of the present invention to provide an improved personal emergency signaling device.

It is a feature of the present invention to provide an improved personal emergency signaling device that is small in nature and designed to fit into a case along with a pager, a watch or the like.

Briefly described according to one embodiment of the present invention, a personal emergency signaling device is provided that, it is envisioned, will always be carried with an individual, so that emergency services can always be summoned. Such instances where help would be required would be assault, theft, rape, gunfire, fire, severe weather conditions, sudden illnesses and the like. The device would be purchased in a ready-to-activate state. A fee would be charged at the time of purchase to offset the cost of setting up full time emergency operations that utilize the existing 911 telephone systems. Once activated, it would have to be returned to a service center to be rearmed for another fee. Any misuse of the invention would be governed by a contractual obligation that would require the submission of a fee to offset the costs for the rescue operation. Depending on the enclosure that the device is mounted, an activation switch or pushbutton would request emergency help from anywhere in the world. The device could include a microphone for the transmission of live audio from the incident scene as well.

Advantages of the present invention allow the emergency signaling device to summons emergency help anywhere in the world, and automatically calls 911 and signals its location. It is envisioned that it can be used for crimes, natural disasters, fires, and the like, and may include a microphone for the transmission of live audio.

Provided as part of pager, watch fits in any small enclosure.

| DESCRIPTIVE KEY | |
|---|---|
| 10 | personal safety signaling apparatus |
| 15 | enclosure |
| 20 | power indication light |
| 25 | front panel |
| 30 | internal microphone |
| 35 | activation means |
| 40 | activation means cover guard |
| 45 | antenna |
| 50 | belt clip |
| 55 | pager enclosure |
| 60 | operating controls |
| 65 | output display |
| 70 | power switch |
| 75 | attachment clip |
| 80 | wrist watch |
| 85 | watch face |
| 90 | strap |
| 95 | fastening means |
| 100 | time setting means |
| 105 | recessed activation means |
| 110 | user |
| 115 | first wireless link |
| 120 | satellite |
| 125 | land-based wireless reception means |
| 130 | central monitoring station |
| 135 | second wireless link |
| 140 | land-based communication link |
| 145 | emergency response vehicle |
| 150 | conventional alerting method |
| 155 | first functional block |
| 160 | second functional block |
| 165 | third functional block |
| 170 | fourth functional block |
| 175 | fifth functional block |
| 180 | first operational block |
| 185 | sixth functional block |
| 190 | seventh functional block |
| 195 | eighth functional block |

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the FIGS. 1 through 4.

1. Detailed Description of the Figures

Figure 1:
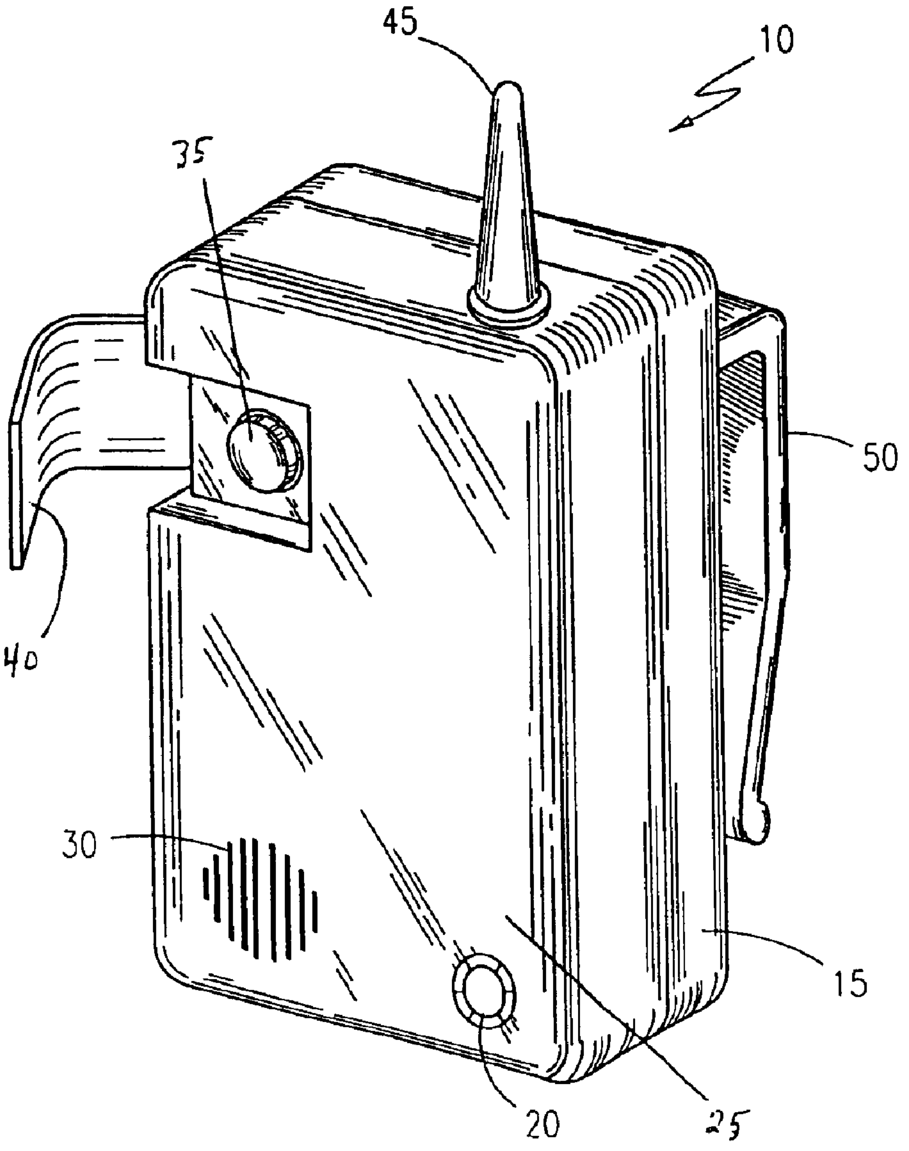
FIG. 1 is a perspective view of the personal safety signaling apparatus 10 according to a preferred embodiment of the present invention.

Referring now to FIG. 1, a personal safety signaling apparatus 10 is disclosed. The personal safety signaling apparatus 10 is enclosed in an enclosure 15 envisioned to be of high impact plastic. A power indication light 20 is located on a front panel 25 of the enclosure 15 and indicates the presence of a charged and functional internal battery. Should the power indication light 20 be extinguished, the user will know that the battery must be replaced or recharged. Also located on the front panel 25 is an internal microphone 30. The internal microphone 30 is used to pass audio information from the scene of use of the personal safety signaling apparatus 10 to a monitoring station. This audio information allows for monitoring station personnel to more accurately and quickly determine the nature of the emergency and as such, supply a more appropriate team of emergency personnel. This procedure will be described in greater detail herein below. Also located on the front panel 25 of the enclosure 15 is an activation means 35 such as a toggle switch, located under an activation means cover guard 40. The activation means 35 is used by the user when an emergency situation exists. It is envisioned that these emergency situations could include range from an assault, to a theft, a rape, gunfire, a fire, severe weather conditions, sudden illnesses and the like. The activation means cover guard 40 is present to prevent accidental triggering should the personal safety signaling apparatus 10 be accidently brushed against, placed in a pocket, a purse, a briefcase and similar enclosures. Located on the top of the enclosure 15 is an antenna 45 for use in transmitting the associated radio signals. Located on the rear of the enclosure 15 is a belt clip 50 to allow the personal safety signaling apparatus 10 to be worn on the user's belt or clipped to a pocket. The overall size of the personal safety signaling apparatus 10 is envisioned to be approximately that a cellular telephone. The current technology as used with the personal safety signaling apparatus 10 is currently envisioned to be that of cellular technology due to size, weight, and power requirements, but it should be assumed that other, newer, digital technologies currently under development and those to be used in the future could also be used with the preferred embodiment of the present invention, and as such, should not be interpreted as a limiting factor.

Figure 2:
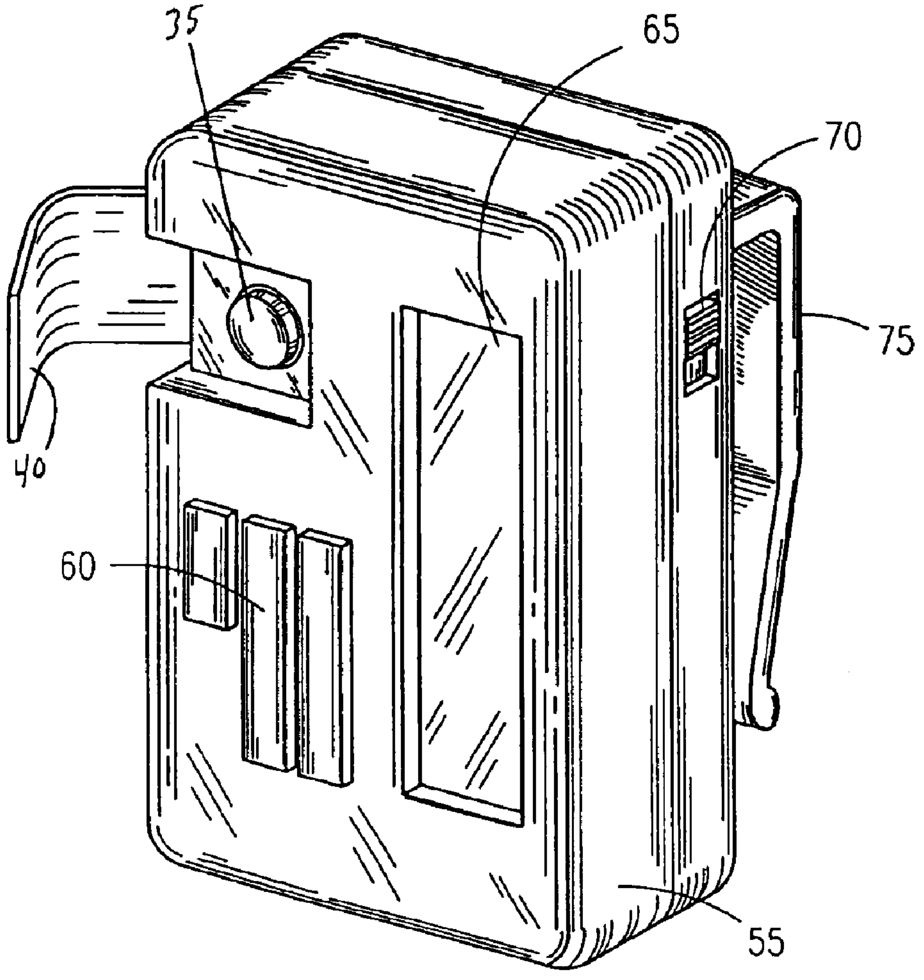
FIG. 2 is a perspective view of the personal safety signaling apparatus as shown provided in a pager enclosure according to an alternate embodiment of the present invention.

Referring next to FIG. 2, a perspective view of the personal safety signaling apparatus 10 as provided in a pager enclosure 55 is disclosed according to an alternate embodiment of the present invention. The pager enclosure 55 contains all the normal controls and items usually associated with a pager. These include the operating controls 60, the output display 65, the power switch 70 and the attachment clip 75. Also located on the front of the pager enclosure 55 are an activation means 35 and an activation means cover guard 40, identical in nature and function to those items described in FIG. 1. While the use of the pager in the pager enclosure 55 operates identically to that of its conventional common counterparts, the activation means 35 and the activation means cover guard 40 allow it to operate the emergency signaling device that is built into the pager enclosure 55. Such multi-use ensures the emergency signaling aspect of the personal safety signaling apparatus 10 will always be present with the user whenever the user carries his or her pager.

Figure 2A:
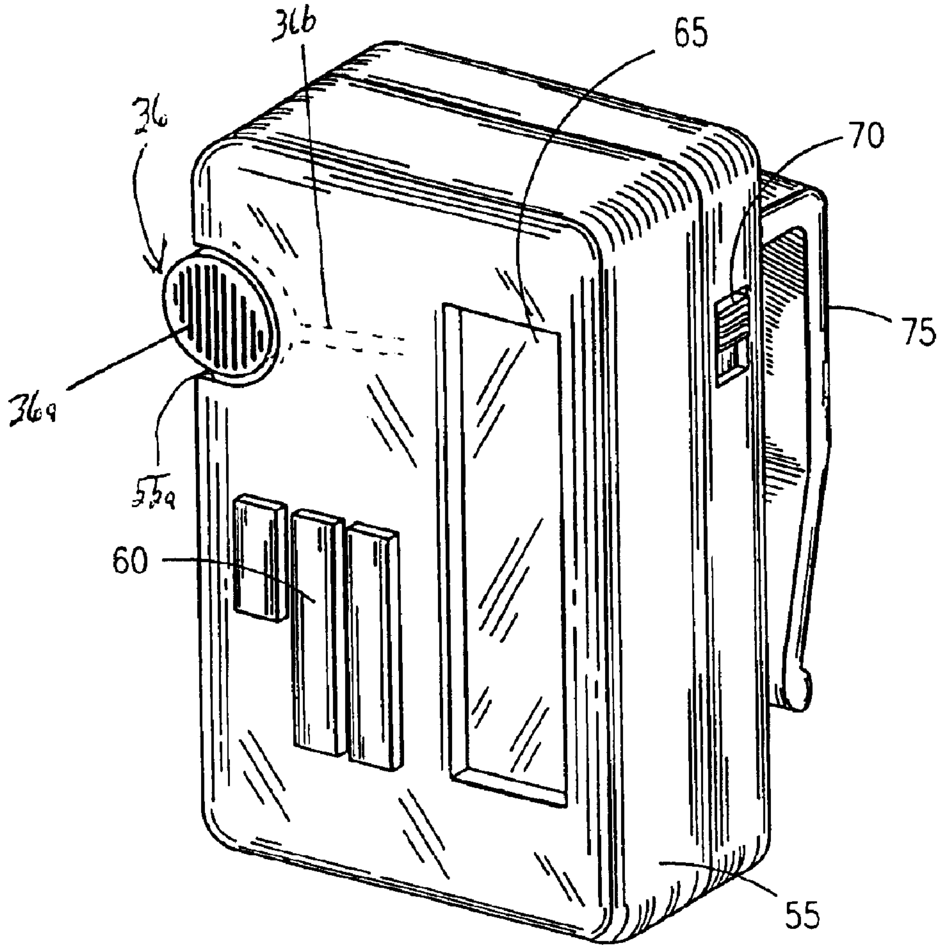
FIG. 2*a* is a perspective view of the personal safety signaling apparatus 10 according to an alternate embodiment of the present invention.

Referring now to FIG. 2*a*, a perspective view of the personal safety signaling apparatus 10 as provided in a pager enclosure 55 is disclosed according to an alternate embodiment of the present invention. The pager enclosure 55 contains all the normal controls and items usually associated with a pager including the operating controls 60, the output display 65, the power switch 70 and the attachment clip 75 as illustrated in FIG. 2. The pager enclosure 55 as shown in FIG. 2*a* is equipped with a modified activation means 36 slidably engaged within a receiving cavity formed within a lateral sidewall of the pager enclosure 55. The front of the pager enclosure 55 includes a semi-circular recess 55*a* for accommodating a ribbed, circular finger-gripping lobe 36*a* having a triggering stem 36*b* projecting linearly therefrom which slidably engages and resides with the receiving cavity of the lateral sidewall of pager enclosure 55. While the use of the pager in the pager enclosure 55 operates identically to that of its conventional common counterparts, the activation means 36 allows it to operate the emergency signaling device that is built into the pager enclosure 55. Such multi-use ensures the emergency signaling aspect of the personal safety signaling apparatus 10 will always be present with the user whenever the user carries his or her pager.

Figure 2B:
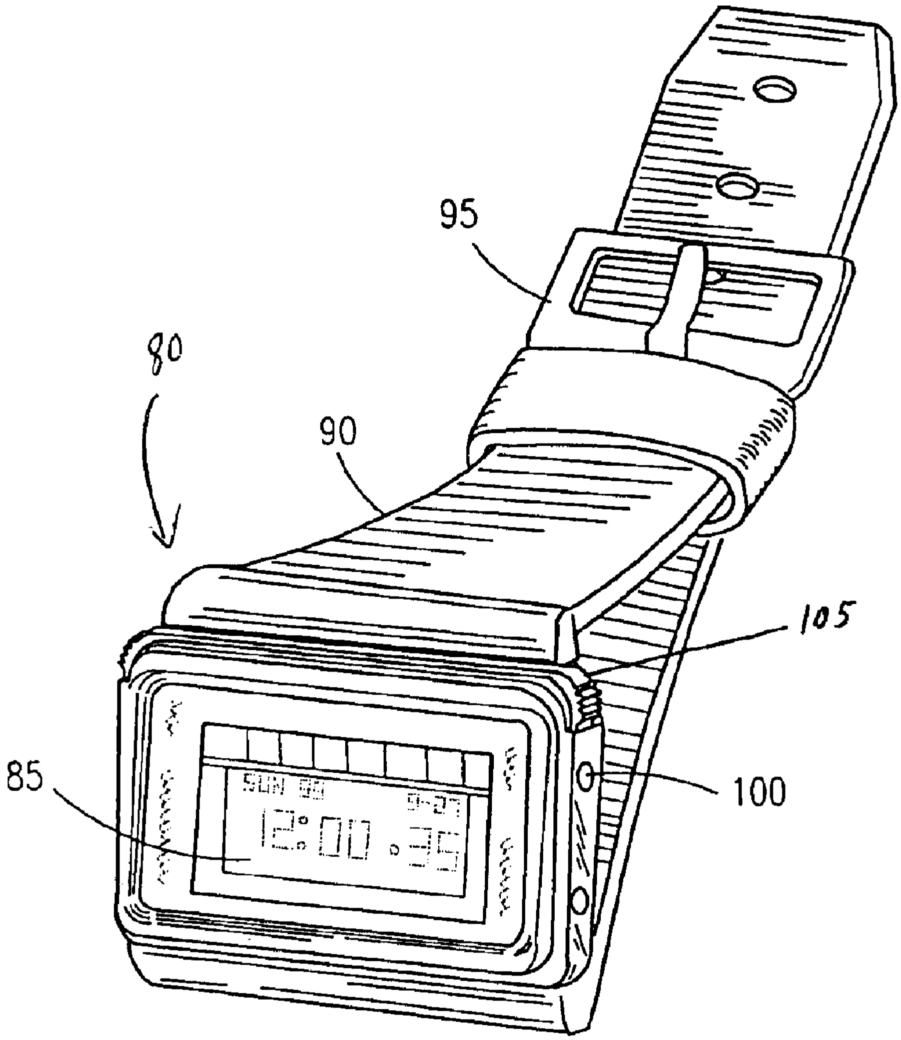
FIG. 2*b* is another perspective view of the personal safety signaling apparatus 10 according to another alternate embodiment of the present invention.

Referring now to FIG. 2*b*, a perspective view of the personal safety signaling apparatus 10 as provided in a wrist watch 80 is depicted according to an alternate embodiment of the present invention. The wrist watch 80 is equipped with a watch face 85, a strap 90, a fastening means 95 and a time setting means 100 as would be found on a conventional watch. A ridged activation means 105 which extends linearly above the watch face 85 in parallel alignment therewith and has curved ridged ends defining opposed upper corners of the watch face 85 as shown. During an emergency event as aforementioned described, the user would simply depress the ridged activation means 105 to trigger the transmission of a remote signal.

Figure 2C:
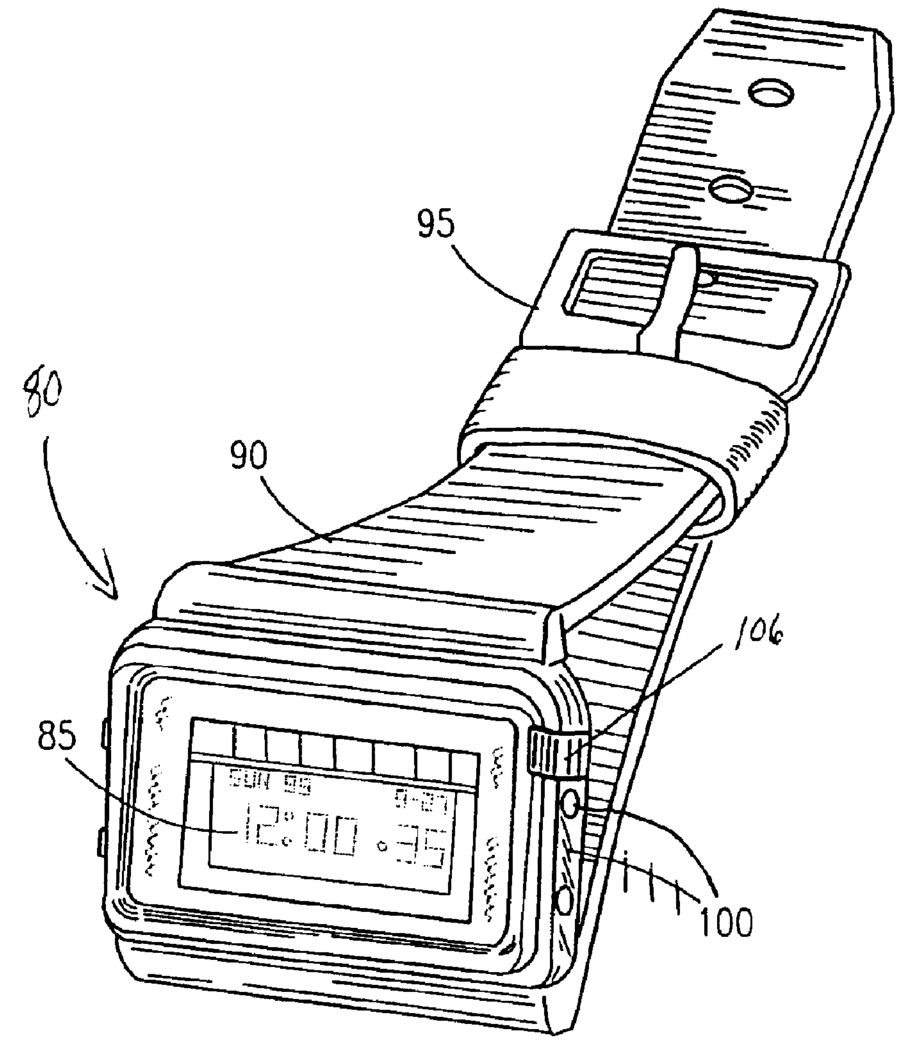
FIG. 2*c* is another perspective view of the personal safety signaling apparatus according to another alternate embodiment of the present invention.

Referring now to FIG. 2*c*, a perspective view of the personal safety signaling apparatus 10 as provided in a wrist watch 80 is depicted according to another alternate embodiment of the present invention. The wrist watch 80 is equipped with a watch face 85, a strap 90, a fastening means 95, and a time setting means 100 as would be found on a conventional watch. A pull-clip 106 is provided on the side of the wrist watch 80 as shown. During an emergency event as aforementioned described, the user would simply pull the pull-clip 106 to trigger the transmission of a remote signal.

Figure 2D:
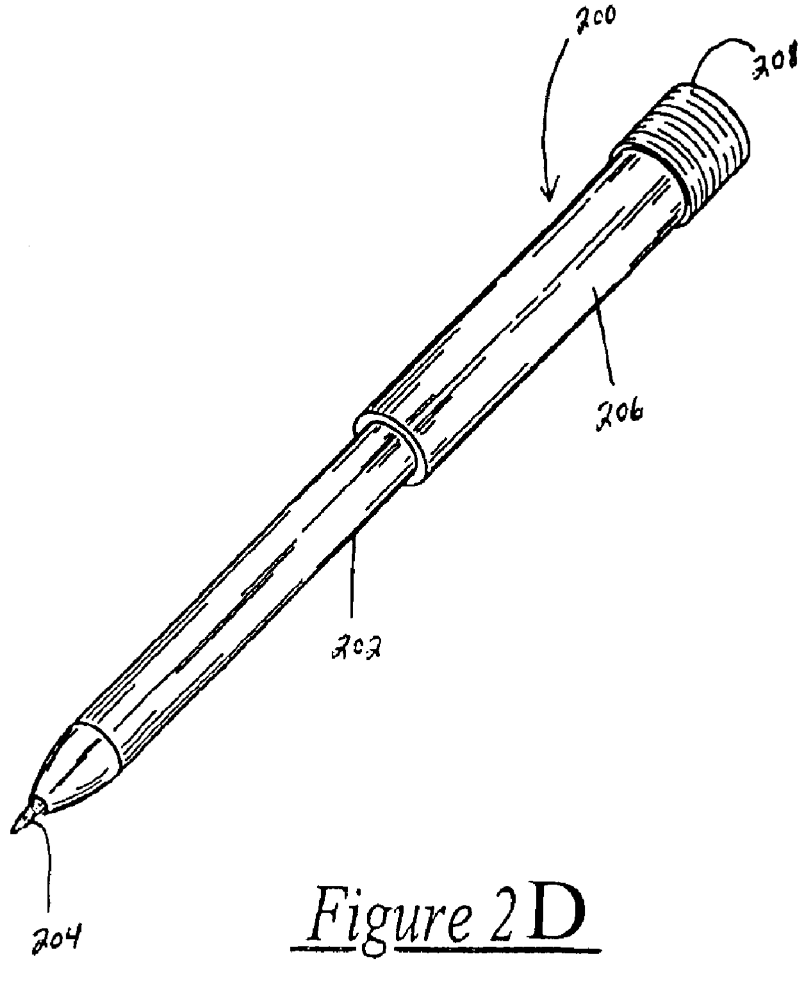
FIG. 2*d* is another perspective view of the personal safety signaling apparatus shown as a writing pen according to another alternate embodiment of the present invention.

Referring now to FIG. 2*d*, a perspective view of the personal signaling apparatus 10 as provided in a writing pen 200 is depicted according to another alternate embodiment of the present invention. The writing pen 200 is equipped with an elongated, cylindrical body 202 having a writing element 204 at a lower end thereof, wherein body 202 is recessed below a simulated hollow upper cap 206, atop to which a ribbed activation knob 208 is slidably engaged. During an emergency event as aforementioned described, the user would simply pull the ribbed activation knob 208 to trigger the transmission of a remote signal.

All of the alternate embodiments as depicted in FIGS. 2*a*, 2*b*, 2*c* and 2*d* are currently within range of VSLI production, and as the reception and receiving station infrastructure of both analog and digital wireless networks are built up, the use of such alternate embodiments anywhere on the earth's surface will be possible. FIGS. 2*a*–2*d* are intended to disclose the use of the emergency signaling technology in any small, personal item that is normally carried by an individual including a lipstick case, cosmetic compact case, tie clip, necklace and key chain, and as such does not limit the use of the technology in said items.

Figure 3:
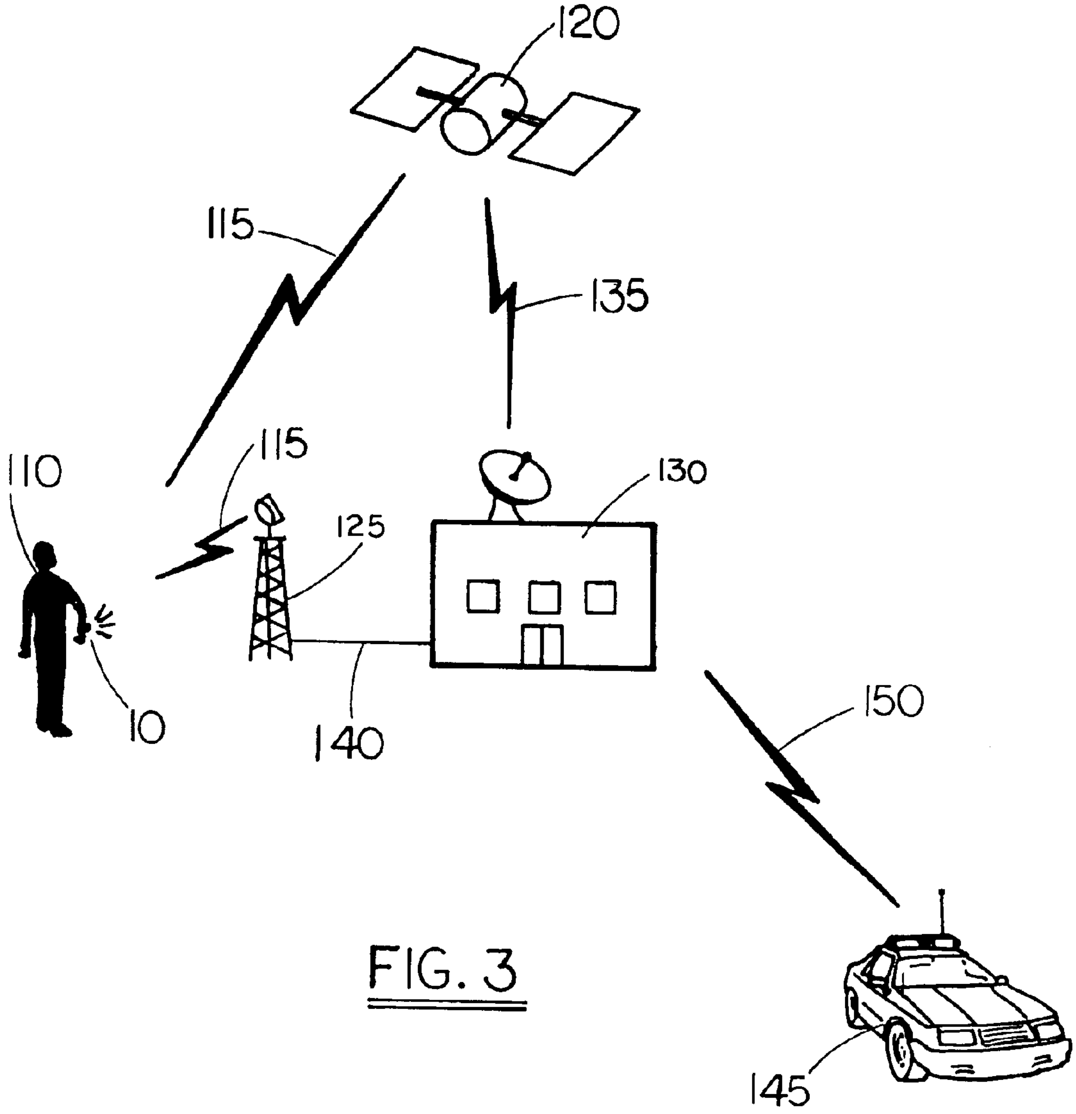
FIG. 3 is a pictorial representation of the wireless radio frequency link as used with the personal safety signaling apparatus 10.

Referring now to FIG. 3, a pictorial representation of the wireless radio link between the various communication systems as used with the personal safety signaling apparatus 10 is depicted. A user 110 is equipped with a personal safety signaling apparatus 10 as shown. In the event of an emergency, the user activates the personal safety signaling apparatus 10 and a first wireless link 115 is transmitted as shown. The first wireless link 115 is received by a satellite 120 or a land-based wireless reception means 125, such as a cellular telephone tower. The land-based wireless reception means 125 is envisioned as being used in large metropolitan areas while the use of the satellite-based system will allow continuous coverage all over the earth, which would be more advantageous than cellular-based links which are not continuous. Both the satellite 120 and the land-based wireless reception means 125 would be capable of triangulating on the first wireless link 115 so that the location of the user 110 could be pinpointed with acceptable accuracy. Most cellular systems are currently undergoing transformation to identify the location of the signal as required by FCC regulations. Such technology would be used in an unaltered state with the current invention to determine location. The emergency signal then continues to a central monitoring station 130 via a second wireless link 135 or a land-based communication link 140, such as a telephone line. The central monitoring station 130 then alerts an emergency response vehicle 145 via a conventional alerting method 150 such as VHF or UHF communications. In addition to be supplied with the nature of the emergency, the emergency response vehicle 145 is also supplied with the location of the emergency via the triangulation method aforementioned described. In this manner, should the user 110 not know or not be able to state their location, they can still be found and services rendered.

Figure 4:
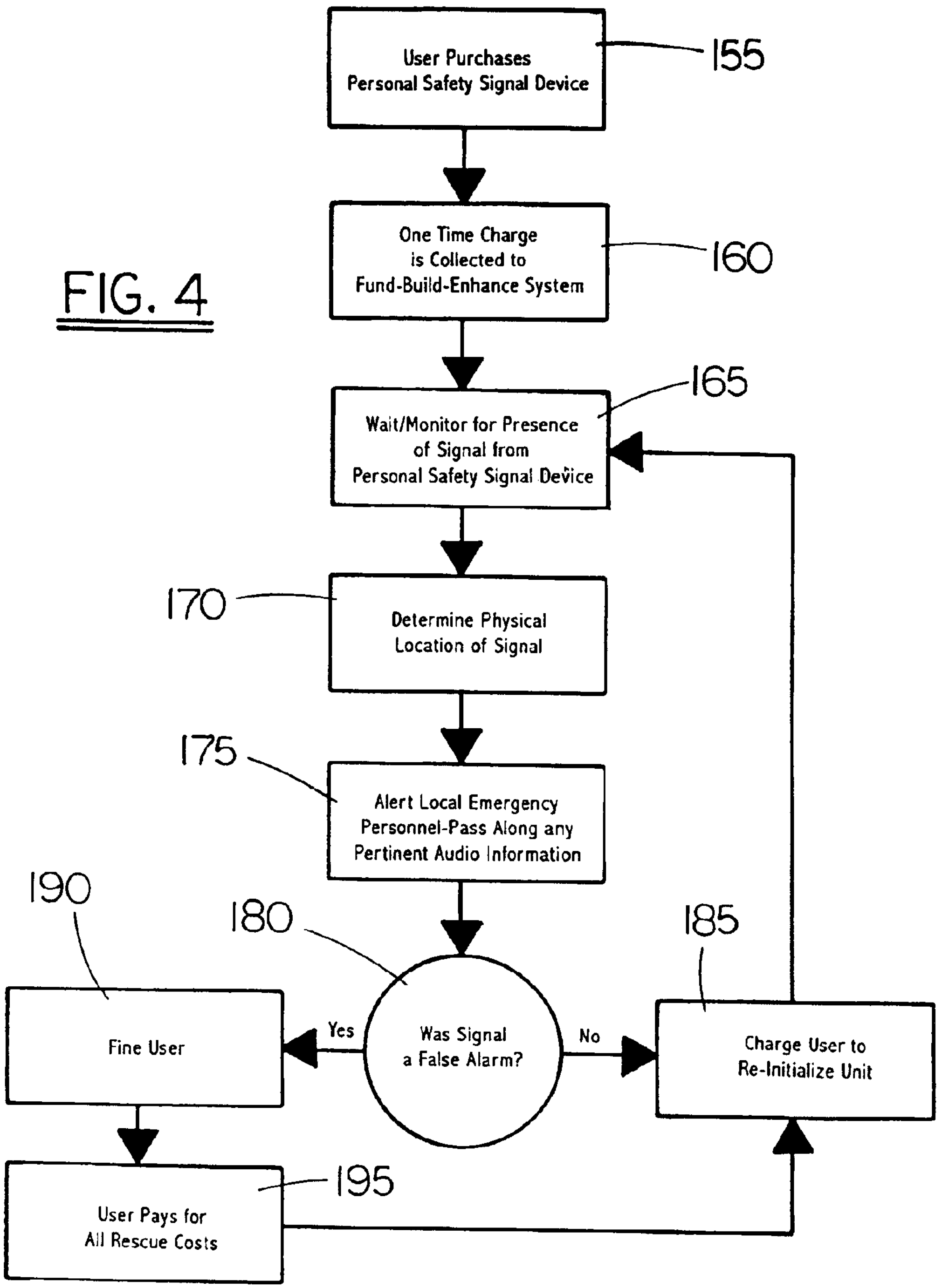
FIG. 4 is a flow diagram depicting the event sequence that occurs when purchasing, activating and using a personal safety signaling apparatus 10.

Referring finally to FIG. 4, a flow diagram depicting the event sequence that occurs when purchasing, activating and using a personal safety signaling apparatus 10 is disclosed. The sequence begins at a first functional block 155 where the user decides that the functions and features of the personal safety signaling apparatus 10 (not shown in this FIG.) are desired. Also occurring during the first functional block 155 is the purchase of the personal safety signaling apparatus 10 (not shown in this FIG.) itself. This purchase is for the electronic device depicted by the enclosure 15 (as shown in FIG. 1) or similar devices as shown in FIGS. 2*a* and 2*b*. This is a one time purchase and will not need to be repeated for the life of the device. At a second functional block 160 the user also pays a connection or service fee to allow access to the system. This fee is also a one time fee, and provided the user does not activate the system, the fee does not need to be repaid. The monies collected by the second functional block 160 are used to fund, build and expand the wireless infrastructure as defined in FIG. 3. At this point the user is activated and ready to utilize the personal safety signaling apparatus 10 (not shown in this FIG.) for any emergency. At a third functional block 165, the central monitoring station 130 (as shown in FIG. 3) begins the monitoring process. Provided an emergency signal should never be received, the process remains at the third functional block 165 indefinitely. Should an emergency signal be received, the process continues to a fourth functional block 170. It is at the fourth functional block 170, that the location of the emergency along with the nature of the emergency is determined. The location is determined by triangulation of the radio signal as aforementioned described. The nature of the invention is determined by listening to the audio content of the emergency signal as provided by the internal microphone 30 (as shown in FIG. 1). At this point the knowledge gained about the emergency is passed to the pertinent emergency personnel at a fifth functional block 175 who respond to the scene in a conventional manner as would be used during any other emergency request such as those identified by conventional telephones, cellular telephones, amateur radio, automatic alarm systems and the like. The determination of whether the request constituted a false alarm is made at a first operational block 180 by the responding emergency personnel. If the request was not a false alarm, the user pays to reinitialize his or her personal safety signaling apparatus 10 (not shown in this FIG.) at a sixth functional block 185 and the sequence of control returns to the third functional block 165. The reinitialization fee is not meant to penalize the user, but instead to allow for the continued growth of the system as defined by the second functional block 160. However, if it is determined the request for emergency assistance was a false alarm, the user must pay a fine at a seventh functional block 190 and pay for all costs associated with the rescue effort at an eighth functional block 195. The user then must also pay for the reinitialization fee at the sixth functional block 185 as well, before the monitoring sequence begins again at the third functional block 165. The seventh functional block 190 and the eighth functional block 195 are meant to discourage false alarms and persuade the user to take necessary precautions from happening again.

It is envisioned that other styles and configurations of the present invention can be easily incorporated into the teachings of the present invention, and only one particular configuration shall be shown and described for purposes of clarity and disclosure and not by way of limitation of scope.

2. Operation of the Preferred Embodiment

The preferred embodiment of the present invention can be used by the common user in a simple and effortless manner. The operation of the personal safety signaling apparatus 10 is best described in conjunction with FIG. 1, FIGS. 2*a*–2*d*, FIG. 3 and FIG. 4.

The decision to purchase the personal safety signaling apparatus 10 must be made on an individual basis. While the functions and features provided by it are applicable and usable to almost everyone, it is envisioned that some people would be more in need of it than others. This group includes the elderly who live and/or travel alone, young children who travel back and forth to school by themselves, women who work after dark, anyone who works and/or travels through questionable neighborhoods, and the like. Once the decision has been made to purchase such a device, the question of which type of device comes into play. The personal safety signaling apparatus 10 can be a basic unit as described in FIG. 1 or built into another personal unit such as a pager enclosure 55 or a wrist watch 80. Once the device is purchased, it must be activated in a manner similar to that used with conventional cellular telephones or pagers, as shown in the second functional block 160. The actual user, whether it is a young child or an elderly adult, must be shown the basic operating features of the personal safety signaling apparatus 10, however, due to its simple and basic use, it is capable of being mastered by the ordinary user with little or no training. At this point the central monitoring station 130 begins the monitoring process.

Upon reception of the emergency signal from the personal safety signaling apparatus 10, the central monitoring station 130 notifies the proper authorities as described in FIG. 3. The responding emergency response vehicle 145 or vehicles handle the emergency using conventional and well known methods. These vehicles are envisioned to be local law enforcement agencies, local fire departments or local rescue squads. However, with the added information gleaned from the location and nature of the emergency, other vehicles such as search and rescue teams, helicopters, federal law enforcement agencies, specialized medical care and the like may also be dispatched. At this point, a determination of the actual emergency and whether or not it necessitated the use of the personal safety signaling apparatus 10 is made. Any fines or usage fees that result from a false alarm must be payed by the user or responsible individual. If the user wishes to continue use of the personal safety signaling apparatus 10, the reinitialization fee must be paid. If paid, the monitoring sequence then begins anew.

The foregoing description is included to illustrate the operation of the preferred embodiment and is not meant to limit the scope of the invention. The scope of the invention is to be limited only by the following claims.

What is claimed is:

1. A personal safety signaling apparatus comprising:

first wireless communication means, said first wireless communication means for transmitting an emergency radio signal;

an activation means for initiating said first wireless communication means;

a first wireless link for receiving said emergency radio signal, said first wireless link capable of communicating the presence of said emergency radio signal to a central monitoring station via a second wireless link;

said central monitoring station capable of determining the location of said first wireless link via triangulation of said emergency radio signal, said central monitoring station further capable of alerting an emergency response vehicle via an otherwise conventional alerting method; and a wrist watch having ridged said activation means extending linearly above a watch face in parallel alignment therewith and having curved ridge ends defining opposed upper corners of said watch face; and a pull-clip placed on a side of said watch, said pull-clip pulled to trigger transmission of a remote signal.

2. The personal safety signaling apparatus of claim 1, further comprising:

a microphone, and a second wireless communication means, said second wireless communication means capable of communicating audible input acquired by said microphone to said first wireless link.

* * * * *